(12) United States Patent
Pan

(10) Patent No.: US 7,913,559 B2
(45) Date of Patent: Mar. 29, 2011

(54) CASING ASSEMBLY OF A MONITOR

(75) Inventor: Ching-Tsung Pan, Taipei (TW)

(73) Assignee: Everfocus Electronics Corp., Taipei (TW)

( * ) Notice: Subject to any disclaimer, the term of this patent is extended or adjusted under 35 U.S.C. 154(b) by 410 days.

(21) Appl. No.: 12/149,267

(22) Filed: Apr. 29, 2008

(65) Prior Publication Data

US 2009/0266158 A1    Oct. 29, 2009

(51) Int. Cl.
*G01D 11/24* (2006.01)
(52) U.S. Cl. .......................................... 73/431; 348/373
(58) Field of Classification Search ............. 73/431; 340/963.5, FOR. 106; 348/373; 361/679.58
See application file for complete search history.

(56) References Cited

U.S. PATENT DOCUMENTS

| | | | | |
|---|---|---|---|---|
| 737,439 | A | * 8/1903 | Michie | 73/431 X |
| 2,226,971 | A | * 12/1940 | Goldhammer | 352/230 |
| 5,253,493 | A | * 10/1993 | Ohashi | 68/4 |
| 5,940,122 | A | * 8/1999 | Kizawa et al. | 348/151 |
| 6,336,698 | B1 | * 1/2002 | Imai | 347/32 |
| 6,429,998 | B1 | * 8/2002 | Aoki et al. | 360/96.51 |

FOREIGN PATENT DOCUMENTS

| JP | 54134458 A | * | 10/1979 |
|---|---|---|---|
| JP | 56118614 A | * | 9/1981 |
| JP | 56138212 A | * | 10/1981 |
| JP | 56138213 A | * | 10/1981 |
| JP | 56138214 A | * | 10/1981 |
| JP | 59198314 A | * | 11/1984 |
| JP | 62014020 A | * | 1/1987 |

* cited by examiner

*Primary Examiner* — Thomas P Noland
(74) *Attorney, Agent, or Firm* — Rabin & Berdo, P.C.

(57) ABSTRACT

The present invention relates to a casing assembly of a monitor. The monitor includes a casing, a cover and a connecting arm. The casing has a first end and a second end. The second end has a plurality of fixing portions. The cover is provided with a plurality of fixing elements that correspond to the fixing portions and are fixed to each other. These fixing elements can be operated manually. One end of the connecting arm is rotationally connected with the second end of the casing; and the another end of the connecting arm is fixed to the cover thereon so that the cover can be opened or closed manually without any tools at the second end of the casing, and prevent the cover from falling off or being lost easily.

4 Claims, 5 Drawing Sheets

CASING ASSEMBLY OF A MONITOR

BACKGROUND OF THE INVENTION

1. Field of the Invention

The present invention relates to a casing assembly of a monitor, and in particular to a combination of a casing, a cover and a connecting arm, whereby the cover may not fall off easily after being opened. A user can open the cover manually. Further, the present invention can be applied to various monitors or the like.

2. Description of Prior Art

In order to frighten and prevent crime, it is a good way to mount monitors at different places.

The monitor is provided with a cover, so that the cover has to be opened when a user intends to connect signal lines and power lines or repair these lines. After the signal lines and the power lines are completely connected or repaired, the user closes the cover back to the monitor.

Since the monitors are mounted at higher positions and the cover is fixed to the monitor by screw elements, it is necessary to use a tool to open or close the cover so as to loosen or tighten the screw elements. If the user drops a tool from a higher position accidentally, there is a risk of hurting someone underneath. Further, since only screw elements are used to connect the cover and the monitor, if the user loosens the screw elements to open the cover, the cover is detached from the monitor completely, which may cause the risk of losing the cover.

Therefore, in view of the above drawbacks of prior art, the inventor of the present invention has proposed a novel and inventive structure based on his expert experience and researches.

SUMMARY OF THE INVENTION

The primary object of the present invention is to provide a casing assembly of a monitor. With a connecting arm being connected between a casing and a cover of the monitor, the cover may not fall off easily or even lost after being opened. With a plurality of hand-operated fixing elements being fixed between the casing and the cover, the user can open or close the cover manually without using any tool.

In order to achieve the above objects, the present invention is to provide a casing assembly of a monitor. The monitor includes a casing, a cover and a connecting arm. The casing has a first end and a second end. The second end has a plurality of fixing portions. The cover is provided with a plurality of fixing elements that correspond to the fixing portions and are fixed to each other. These fixing elements can be operated manually. One end of the connecting arm is rotationally connected with the second end of the casing; and the another end of the connecting arm is fixed to the cover thereon so that the cover can be opened or closed manually without any tools at the second end of the casing, and prevent the cover from falling off or being lost easily.

In order to further understand the characteristics, features and technical contents of the present invention, a detailed description of the present invention will be made with reference to the accompanying drawings. However, the drawings are illustrative only but not used to limit the scope of the present invention.

DETAILED DESCRIPTION OF THE INVENTION

Please refer to FIGS. 1 to 5. The present invention provides a casing assembly of a monitor. The monitor includes a casing 1, a cover 3 and a connecting arm 4.

Figure 1:
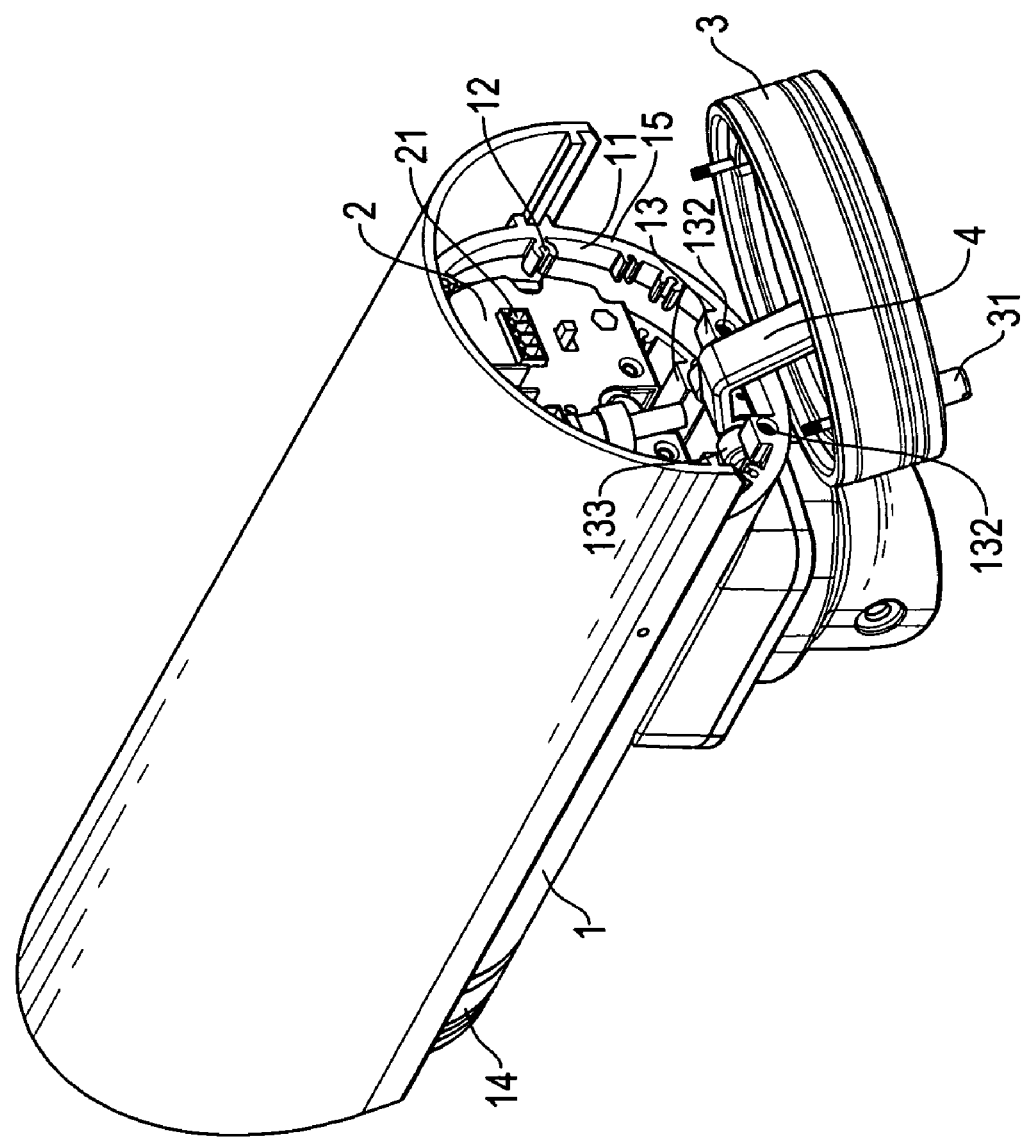
FIG. 1 is a perspective view showing the external appearance of the embodiment of the present invention.
Figure 2:
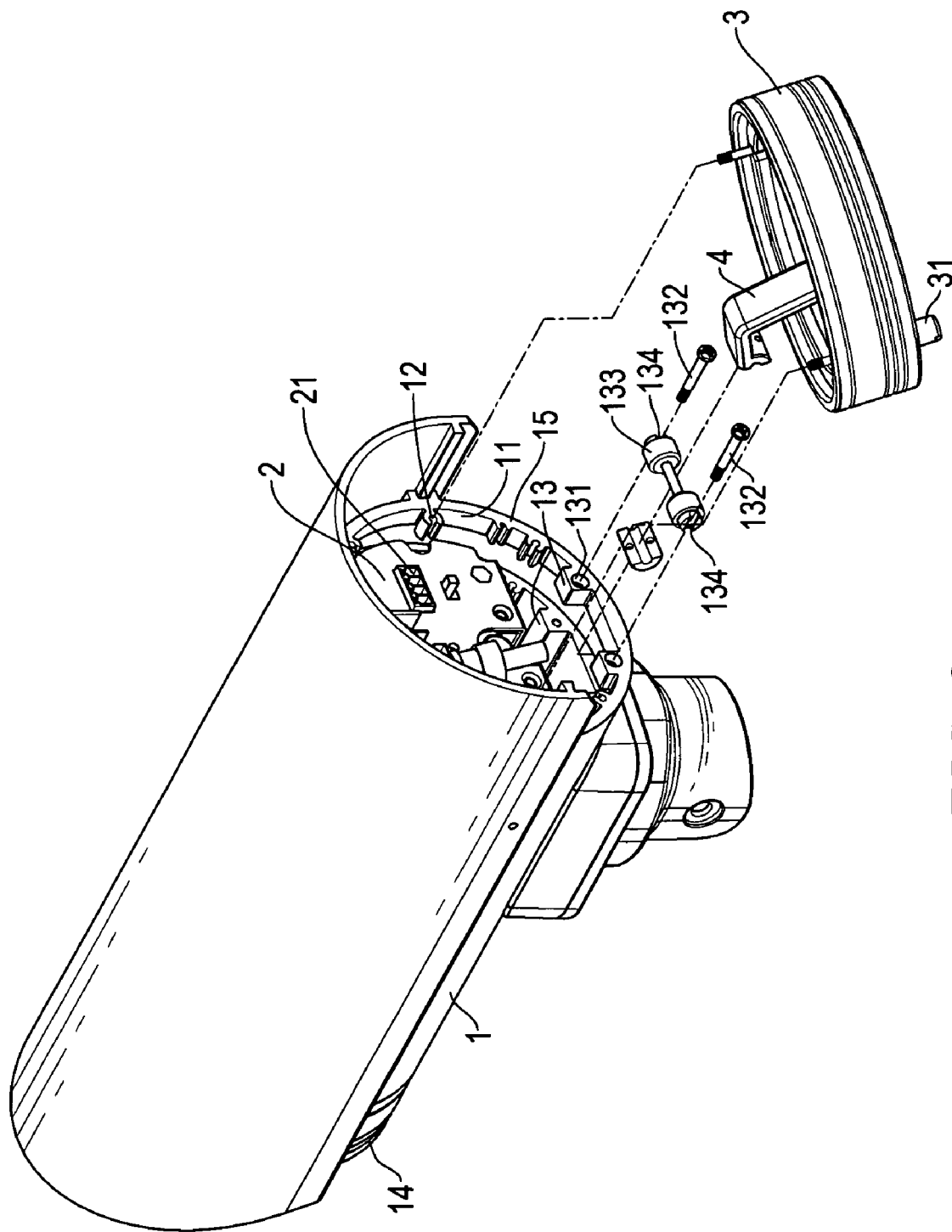
FIG. 2 is an exploded perspective view showing the embodiment of the present invention.
Figure 3:
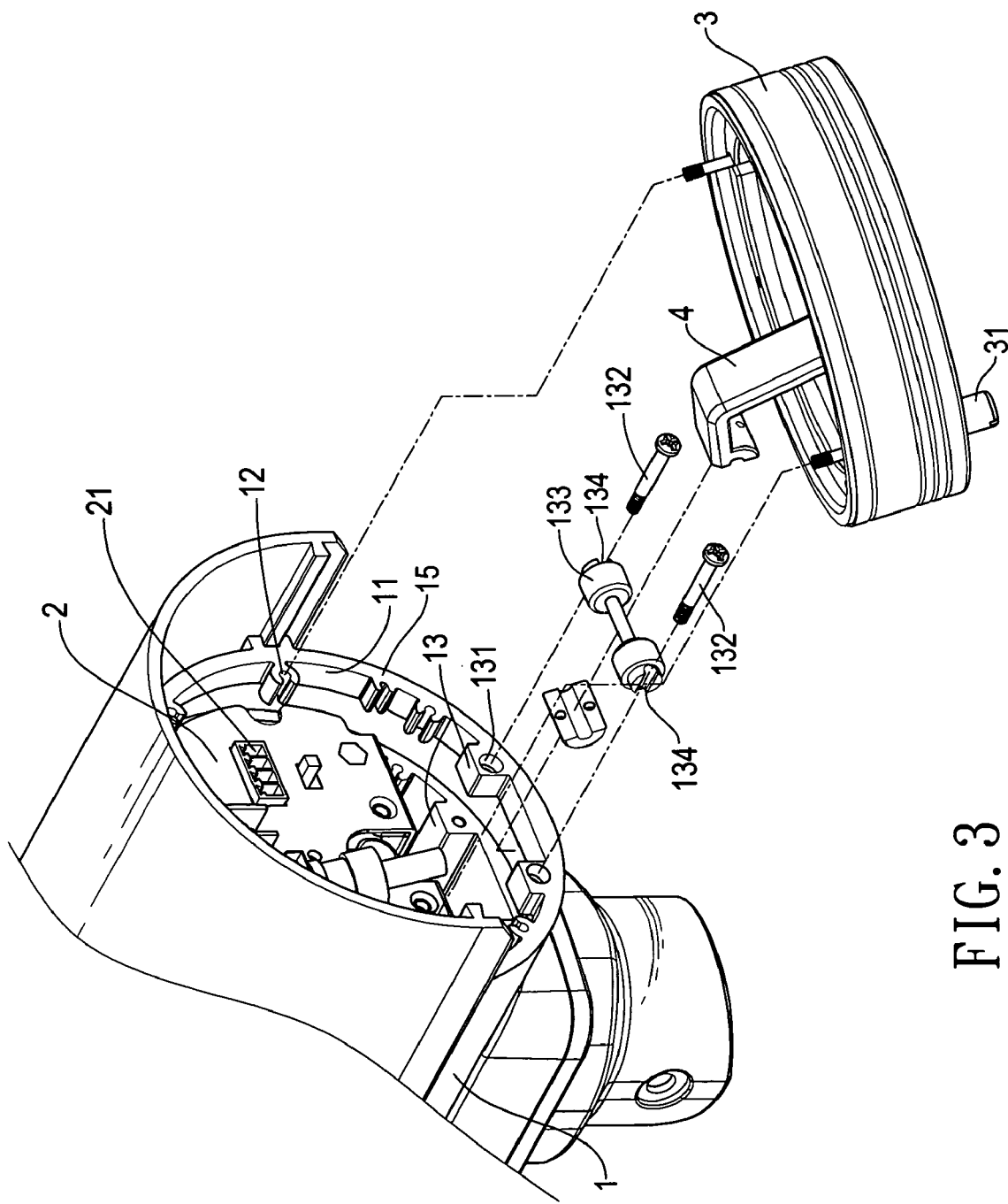
FIG. 3 is a partially enlarged view of the embodiment of the present invention shown in FIG. 2.
Figure 4:
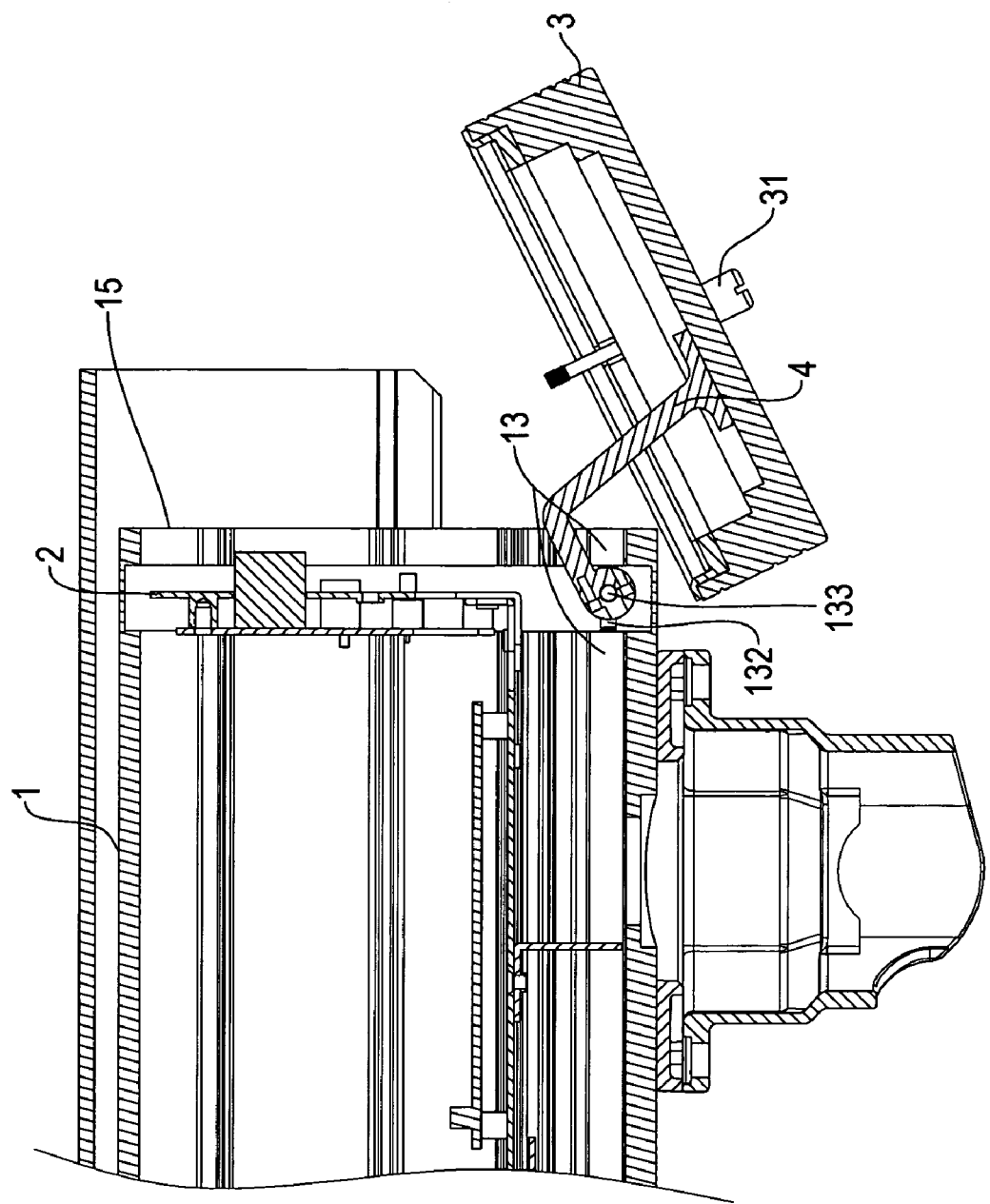
FIG. 4 is a cross-sectional view showing the embodiment of the present invention with the cover opened.
Figure 5:
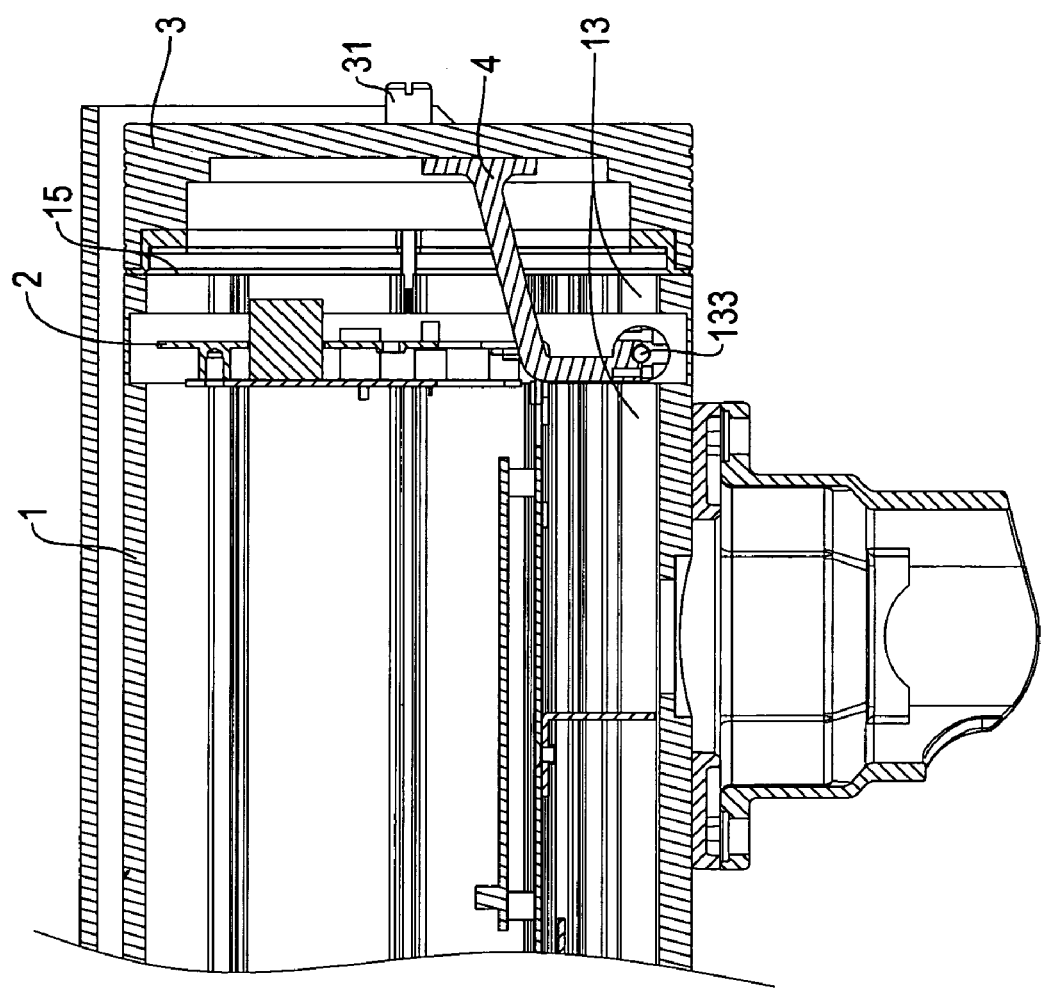
FIG. 5 is a cross-sectional view showing the embodiment of the present invention with the cover closed.

The casing 1 has a first end 14 and a second end 15. An inner wall 11 of the casing 1 near the second end 15 is provided with a plurality of fixing portions 12 and at least one connecting base 13. Both ends of the connecting base 13 have a positioning hole 131 respectively. Inside the connecting base 13, a pivotal shaft 133 is fixed. As shown in FIGS. 1 and 3, the connecting base 13 has two axial ridges protruding from the inner wall 11 of the casing 1. A groove is recessed in radial between the two ridges. The pivotal shaft 133 is accommodated in the groove. Each of the two ridges has an axial positioning hole 131.

The cover 3 is provided with a plurality of fixing elements 31 corresponding to the fixing portions 12. These fixing elements 31 can be operated manually without any tool. For example, these fixing elements 31 are screws that can be rotated manually. These screws penetrate the cover 3 and are fixed to the corresponding fixing portions 12.

The connecting arm 4 is connected between the connecting base 13 of the casing 1 and the cover 3. One end of the connecting arm 4 is rotationally connected to the connecting base 13, and the another end of the connecting arm is connected to the cover 3, so that the cover 3 can be opened or closed at the second end 15 of the casing 1. One end of the connecting arm 4 is pivotally connected to the pivotal shaft 133. Both ends of the pivotal shaft 133 have a trough 134 respectively. Both ends of the connecting base 13 have a positioning hole 131 respectively. Two positioning elements 132 are inserted and fixed in the two troughs 134 of the pivotal shaft. The two positioning elements 132 are extended in the two corresponding troughs 134 to position the pivotal shaft 133. The connecting arm 4 rotates around the pivotal shaft 133. Alternatively, the connection between one end of the connecting arm 4 and the cover 3 can be integrally formed. Also, another end of the connecting arm 4 can be fixed to the cover 3 by means of connecting (such as welding, riveting or screw elements).

The interior of the casing 1 is provided with a plate 2. The plate 2 is provided in the casing 1 near the second end 15. Therefore, the plate 2 can be exposed or masked by the opening or closing of the cover 3. The plate 2 is provided thereon with a plurality of electronic elements 21 that are electrically connected with signal lines and power lines, thereby providing the necessary power for the monitor and transmitting image signals.

The characteristics of the casing assembly of a monitor in accordance with the present invention are as follows. With a connecting arm 4 being connected between the casing 1 and the cover 3, the cover 3 may not fall off or lost easily after being opened. Further, with the plurality of hand-operated fixing elements 31 being fixed between the casing 1 and the cover 3, the user can open or close the cover 3 manually without any tool. For example, when the user intends to connect the power lines and signal lines, the user can rotate the fixing elements 31 manually and then open the cover 3 by using the connecting portion between one end of the connecting arm 4 and the connecting base 13 as a rotating shaft. The power lines and signal lines are electrically connected to the corresponding electronic elements 21 of the plate 2 (of course, the above steps can be similarly applied to the repairing operation). When the user connects or repairs the lines, since the cover 3 is always connected to the casing 1 by means of the connecting arm 4, the cover 3 may not lost after being opened. After the user completes the connecting or repairing operation, the user only needs to close the cover 3 and then rotate the fixing element 31 manually to screw the fixing elements 31 to the corresponding fixing portions 12. In this way, the cover 3 firmly covers the second end 15 of the casing 1. In opening or closing the cover 3, it is unnecessary for the user to use a tool. The whole operation can be operated manually, and thus the convenience is enhanced.

Although the present invention has been described with reference to the above-mentioned preferred embodiment, this specific embodiment is not used to limit the scope of the present invention. All the equivalent modifications in structure made in view of the disclosure of the specification and drawings will be embraced in the appended claims.

To sum up, the present invention is capable of achieving the anticipated objectives described above and solving the drawbacks of prior art. Further, the present invention really has novelty and inventive steps. Therefore, this application is filed according to the patent law.

What is claimed is:

1. A casing assembly of a monitor, comprising:
    a casing having an inner wall in an interior thereof, and having a first end and a second end, the second end having a plurality of fixing portions on the inner wall, the inner wall being provided with at least one connecting base having two opposing ends each having a respective positioning hole;
    a pivotal shaft fixed to the connecting base, each end of the pivotal shaft having a trough;
    two positioning elements, each being inserted and fixed in a respective one of the troughs, the two positioning elements being extended in the respective troughs to position the pivotal shaft;
    a cover provided with a plurality of fixing elements corresponding to the fixing portions, the fixing elements being operated manually to engage and disengage with the corresponding fixing portions; and
    a connecting arm having one end thereof pivotally connected to the pivotal shaft so as to be rotationally connected with the second end of the casing, and another end thereof being fixed to the cover, whereby the cover is able to be opened or closed at the second end of the casing without falling off.

2. The casing assembly of a monitor according to claim 1, wherein the another end of the connecting arm is integrally formed on the cover.

3. The casing assembly of a monitor according to claim 1, wherein the another end of the connecting arm is fixed to the cover by means of connecting.

4. The casing assembly of a monitor according to claim 1, wherein the fixing elements are screws that are rotated manually, and the screws penetrate the cover to be fixed to the corresponding fixing portions.

* * * * *